United States Patent
Johansson

(10) Patent No.: US 8,385,925 B2
(45) Date of Patent: Feb. 26, 2013

(54) SELECTION OF CORE NETWORK NODES IN A COMMUNICATION NETWORK

(75) Inventor: Ola Johansson, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 135 days.

(21) Appl. No.: 13/058,866

(22) PCT Filed: Aug. 14, 2008

(86) PCT No.: PCT/EP2008/006706
§ 371 (c)(1),
(2), (4) Date: Feb. 14, 2011

(87) PCT Pub. No.: WO2010/017826
PCT Pub. Date: Feb. 18, 2010

(65) Prior Publication Data
US 2011/0136529 A1 Jun. 9, 2011

(51) Int. Cl.
*H04W 40/00* (2009.01)
*H04B 15/00* (2006.01)
(52) U.S. Cl. .................. 455/445; 445/509
(58) Field of Classification Search .......... 455/509, 455/524, 525, 445, 436, 438; 370/310, 328, 370/331, 332
See application file for complete search history.

(56) References Cited

U.S. PATENT DOCUMENTS

| | | | |
|---|---|---|---|
| 7,284,053 B1 * | 10/2007 | O'Rourke et al. | 709/226 |
| 7,660,278 B2 * | 2/2010 | Qi et al. | 370/328 |
| 7,747,275 B2 * | 6/2010 | Funnell et al. | 455/525 |
| 7,751,803 B2 * | 7/2010 | Vialen et al. | 455/414.1 |
| 7,912,494 B2 * | 3/2011 | Funnell et al. | 455/525 |
| 7,916,648 B2 * | 3/2011 | Schloemer | 370/238 |
| 8,098,638 B2 * | 1/2012 | Spiess | 370/338 |

FOREIGN PATENT DOCUMENTS

| | | |
|---|---|---|
| WO | WO 98/59468 A2 | 12/1998 |
| WO | WO 03/001830 A1 | 1/2003 |
| WO | WO 2006/037664 A2 | 4/2006 |

OTHER PUBLICATIONS

3GPP. 3rd Generation Partnership Project; Technical Specification Group Services and System Aspects; Intra-domain Connection of Radio Access Network (RAN) Nodes to Multiple Core Network (CN) Nodes (Release 7). 3GPP TS 23.236 v7.0.0. Dec. 2006.

3GPP. Digital Cellular Telecommunications System (Phase 2+); Universal Mobile Telecommunications System (UMTS); Intra-domain Connection of Radio Access Network (RAN) Nodes to Multiple Core Network (CN) Nodes (3GPP TS 23 236 v7.0 0 Release 7), ETSI TS 123 236 v7.0.0. Jun. 2007.

* cited by examiner

*Primary Examiner* — Sonny Trinh
(74) *Attorney, Agent, or Firm* — Roger S. Burleigh

(57) ABSTRACT

Method of selecting a communications node for allocation to a user communications device. The method comprises selecting the communications node from a plurality of communications nodes of a communications network. The method further comprising performing a calculation to determine a selection value, which calculation includes as input data at least one of first identifier data identifying selection equipment configured to select a communications node from a plurality of communications nodes, and second identifier data identifying a radio cell with which the user communications device is associated. The method also comprises using the selection value in selecting the communications node.

16 Claims, 3 Drawing Sheets

SELECTION OF CORE NETWORK NODES IN A COMMUNICATION NETWORK

TECHNICAL FIELD

The present invention relates generally to communications networks.

BACKGROUND

A feature called Intra-domain connection of Radio Access Network nodes to multiple Core Network Nodes was included in release 5 of 3GPP standards. The specification 23.236 {3GPP TS 23.236 $3^{rd}$ Generation Partnership Project Technical Specification Group Services and System Aspects: Intra-domain connection of Radio Access Network (RAN) nodes to multiple Core Network (CN) nodes} defines how radio access network nodes (Base Station Controllers (BSCs) or Radio Network Controllers (RNCs)) can connect to more than one core network node (Mobile Switching Centre (MSC) or Serving GPRS Support Node (SGSN)) at the same time instead of just one at a time as was previously the case when each BSC or RNC was connected to one and only one SGSN or MSC.

A radio access network node chooses a core network node to handle a particular user communications device such as a Mobile Station (MS). This procedure is called Network Access Server (NAS) Node Selection which for the case of packet switched part of the network equates to SGSN Selection. The procedure aims to distribute MSs between the SGSN nodes in a fair manner.

After a SGSN has been chosen for a particular MS in a Global System for Mobile (GSM) network, the SGSN allocates a Packet-Temporary Mobile Subscriber Identity (P-TMSI) to the MS. The P-TMSI is contained within a Temporary Logical Link Identifier (TLLI). A part of the P-TMSI contains the Network Resource Identifier (NRI), which identifies a SGSN. The NRI is then used by the BSC to route uplink packets to the correct SGSN.

It may arise that an MS may not have a P-TMSI. It may be the first time the MS attaches or the MS may have for some reason lost the P-TMSI). In the allocation procedure the MS is mandated to send a random number instead of the P-TMSI, a so-called random TLLI. This random number is used by the MS until the SGSN has allocated a P-TMSI. Each time a BSC encounters a random TLLI (or the received NRI does not correspond to a reachable SGSN) the BSC performs a deterministic function in order to choose a SGSN to be responsible for the subsequent handling of this MS.

In Packet Switch GSM systems it has been noted that some brands and makes of MSs are not adhering to the standard. Instead of using a proper random TLLI value when attaching, the MSs are using a fixed value TLLI. The effect this has is that the MSs that use the same "static random TLLI" are all concentrated to one and the same SGSN in an SGSN pool by SGSN selection procedures in the BSC. The selection procedures rely on the MSs to adhere to the standard of using a random TLLI when they first attach to the network. In turn this leads to a severely skewed distribution of load between the SGSNs in the SGSN pool, causing some SGSNs to face an overload situation whereas others remains underutilized. One or a few SGSNs can be brought to the verge of overload whereas others only exhibit as moderate or low load.

SUMMARY

According to one aspect of the invention there is provided a method of selecting a communications node for allocation to a user communications device. The method comprises selecting the communications node from a plurality of communications nodes of a communications network. The method further comprising performing a calculation to determine a selection value, which calculation includes as input data at least one of first identifier data identifying selection equipment configured to select a communications node from a plurality of communications nodes and second identifier data identifying a radio cell with which the user communications device is associated. The method then comprising using the selection value in selecting the communications node In one implementation of the method, allocation of transceiver nodes to user communications devices can be spread fairly over a pool of transceiver nodes, even when the user communication nodes do not attach to the network in a correct manner.

According to another aspect of the invention there is provided processor equipment for a communications network. The processor equipment is configured to select a communications node from a plurality of communications nodes and allocate the selected communications node to a user communications device. The equipment configured to make the selection by performing a calculation to determine a selection value and the calculation includes as input data at least one of first identifier data identifying the equipment, and second identifier data identifying a radio cell with which the user communications device is associated. The equipment is further configured to use the selection value in selecting the communications node.

One aspect of the invention relates to a base station subsystem which comprises the processor equipment of the preceding paragraph.

According to a further aspect of the invention there is provided a communications network comprising processor equipment and a plurality of communications nodes. The processor equipment configured to select a communications node from the plurality of communications nodes and allocate the selected communications node to a user communications device. The equipment configured to make the selection by performing a calculation to determine a selection value, the calculation includes as input data at least one of first identifier data identifying the processor equipment, and second identifier data identifying a radio cell with which the user communications device is associated. The equipment further configured to use the selection value in selecting the communications node.

Another aspect of the invention relates to machine-readable instructions for configuring a processor of communications node. The instructions configure the processor to select a communications node from a plurality of communications nodes of a communications network and allocate the selected communications node to a user communications device wherein the instructions configure the processor to make the selection by performing a calculation to determine a selection value. The calculation includes as input data at least one of first identifier data identifying the processor equipment, and second identifier data identifying a radio cell with which the user communications device is associated. The instructions also configure the processor to use the selection value in selecting the communications node.

The machine readable instructions may be provided on a data carrier such as CD, DVD, or may be provided as a data file or in the form of a signal.

BRIEF DESCRIPTION OF THE DRAWINGS

Various embodiments of the invention will now be described, by way of example only, in which.

DETAILED DESCRIPTION

Figure 1:
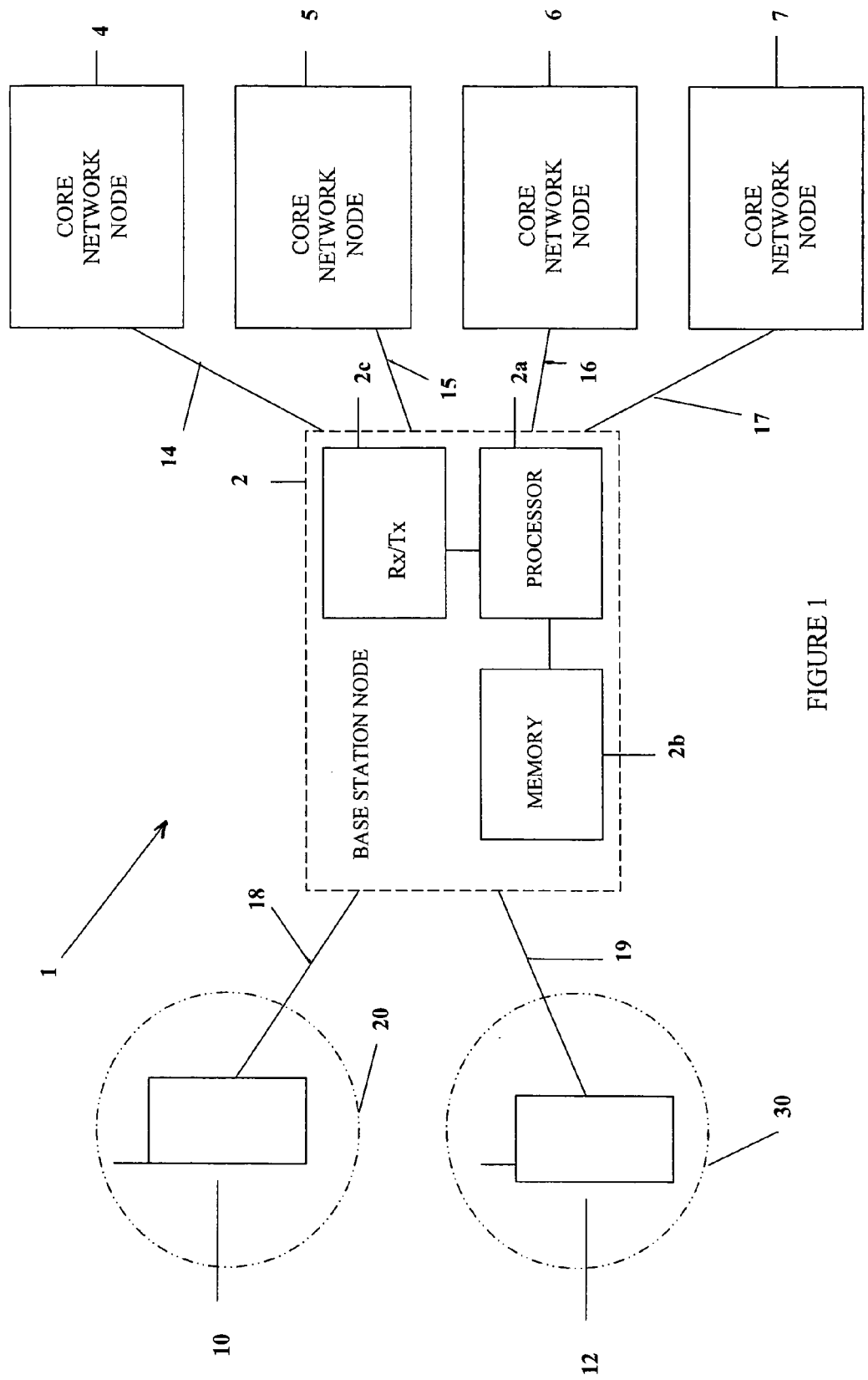
FIG. 1 shows a communications network.

FIG. 1 shows a communications network 1 comprising a base station node 2, core network transceiver nodes 4, 5, 6 and 7, and two user communications devices 10 and 12. Each of the core network transceiver nodes is configured to transmit traffic originating from and destined for a specified one of the user communications devices 10 and 12. The base station node 2 and the user communications devices 10 and 12 communicate with each other in a wireless manner over an air interface using radio signal links 18 and 19. The core network transceiver nodes 4, 5, 6 and 7 and the base station node 2 communicate with each other over optical or electrical communications links 14, 15, 16 and 17 respectively.

The base station node 2 is configured to perform an allocation procedure to select and allocate one of the core network transceiver nodes 4 to 7 to each of the user communications devices 10 and 12 in an advantageous manner. In order to break the potentially uneven distribution of load created when base station nodes are using the same allocation procedure to determine which core network transceiver node is to be responsible for a user communications device, information specific to, and fixed for, each base station node is used in the procedure. The achieved effect is that any 'misbehaving' user communication devices are spread to different transceiver nodes.

The user communications devices 10 and 12 each comprise a mobile communications terminal such as a mobile telephone. The base station node 2 is part of a so-called Base Station Subsystem (BSS) of the network 1. It will be appreciated that typically multiple base station nodes would be provided in a network, each serving a particular geographical area. The core network transceiver nodes may be in the form of Serving GPRS Support Nodes (SGSNs).

The base station node 2 comprises a processor 2a which is configured to serve the user communications devices 10 and 12 which are within a predetermined range from the node 2. The base station node 2 is configured to serve multiple radio cells by way of transceiver equipment 2c. Included in the functionality of the base station node is the task of allocating a particular core network transceiver node to a user communications device. The base station node 2 is configured to select from a predetermined set or pool of core network transceiver nodes comprising the nodes 4 to 7.

Considering the scenario of a core network transceiver node being allocated to the user communication device 10, the base station node 2 performs a deterministic function during the allocation procedure in order to determine a particular core network transceiver node. The allocation procedure commences with a signalling exchange between the base station node 2 and the user communications device 10. The base station node 2 determines from inspecting signalling data sent from the user communications device 10 that the user communications device 10 has not been allocated a core network transceiver node, or for some reason the base station node does not recognise the received Packet-Temporary Mobile Subscriber Identity (P-TMSI). When the user communications device 10 is attempting to connect to the network 1 it issues a so-called random Temporary Logical Link Identifier (TLLI). On receipt of the random TLLI by the base station node 2, the base station node 2 commences a series of process steps of the allocation procedure in order to determine a core network transceiver node for the user communications device 10.

During an initial configuration procedure of the base station node 2, a memory 2b of the base station node 2 is provided with values indicative of the signal processing capabilities of each of the core network transceiver nodes in terms of signal processing capacity values. The processor 2a of the base station node 2 then sums the capacity values to obtain a total signal processing capacity value. This total capacity value is then stored in the memory 2b. The processor 2a then performs further calculations to determine, for each core network transceiver node, a value of each transceiver node's signal processing capacity in relation to the total signal processing capacity. Such values may be termed capacity share values or value ranges. In addition to performing the calculations at the time of the initial configuration, re-calculations are also performed each time a user communications device attempts to attach to the network through the base station node. The re-calculations take account of any transceiver nodes having been added or removed from the pool since the initial calculations were performed.

The following pseudo-code loop may be used to create suitable machine-readable instructions used to configure the processor 2a to perform the above-mentioned calculations, in which the core network transceiver nodes are stated as being SGSNs:

```
Total_capacity = 0
for i = 1 to #SGSNs in the pool
if SGSN[i] is alive then:
Total_capacity = Total_capacity + capacity of SGSN [i]
for i = 1 to #SGSNs in the pool
if SGSN[i] is alive then:
{share of SGSN[i] = Int[100*capacity of SGSN [i]/Total_capacity]
Next
```

It will be appreciated that if the signal processing capacity of a transceiver node changes subsequent to the initial configuration of the base station node 2, for example due to an upgrade in capacity of a transceiver node, then the base station node would be updated accordingly, and the total capacity value and the capacity share values would be revised and stored in the memory 2b.

It will also be appreciated that the determined capacity share value for each transceiver node is expressed as a percentage of the total capacity. This means that the sum of the capacity share values is equal to unity.

It will also be noted that the term 'Int' used above relates to the operation of using only the integer which results from the calculation for determining the capacity share for each transceiver node.

The term 'alive' used above is to be taken to mean that there exists at least one respective Network Service Virtual Connection (NSVC) between the base station node and a transceiver node that is usable. This can happen when a transceiver node has a fault condition or is taken out of the pool for maintenance.

Once the share capacity values are recalculated, the processor 2a of the base station node then proceeds to calculate a value X, which may be termed a selection value, which may be expressed as follows in pseudo code:

$$X = \text{TLLI xor}(\text{NSEI}|\text{BVCI}) \bmod 100$$

in which,

NSEI is the Network Service Entity Identifier of the base station node 2, and BVCI is the BSS Virtual Connection Identifier which is an identifier which is unique to the radio cell in which the user communications device 10 is located. The BVCI is known by way of initial configuration the base station node 2.

To determine X, a bitwise Exclusive-OR logical operation is performed between the TLLI and a concatenation of NSEI and BVCI. Conveniently, TLLI is a thirty-two bit number and the concatenated number is also a thirty-two bit number.

The term 'mod 100' refers to the fact that X is expressed as an integer value between 0 and 99, which, as is described below, allows the value X to be used in a deterministic process in conjunction with the capacity share values of the transceiver nodes.

Figure 2:
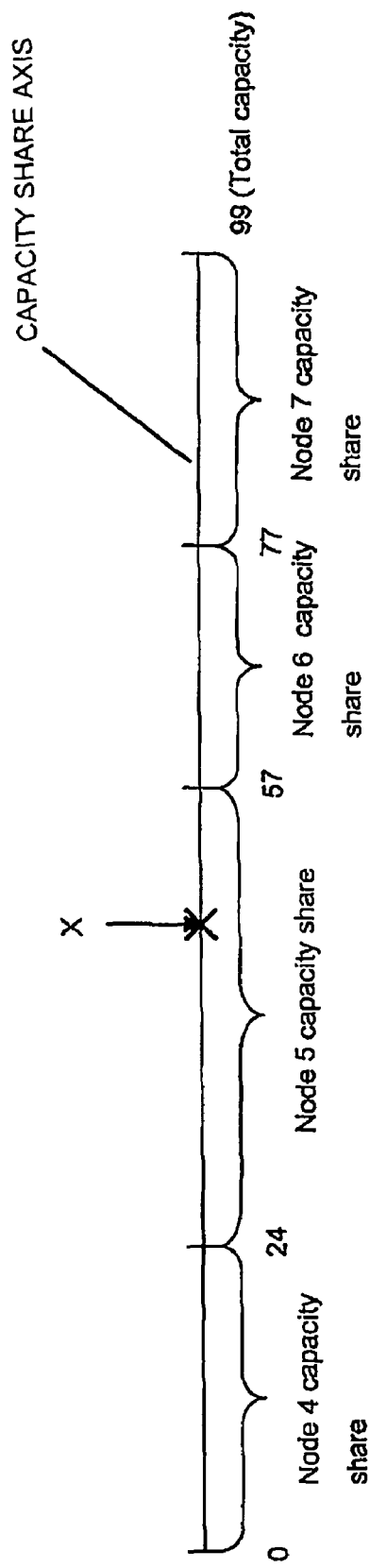
FIG. 2 shows values on an axis, and,
FIG. 3 is a flow diagram.

For the purpose of explanation, the transceiver node 4 is determined to have a capacity share value of 25/100, the transceiver node 5 has a capacity share value of 33/100, the transceiver node 6 has a capacity share value of 20/100 and the transceiver node 7 has a capacity share value of 22/100. FIG. 2 shows a schematic representation of the share capacity values or value ranges on a capacity share axis. As can be seen, each capacity share value occupies a respective portion of the axis.

In order to determine which transceiver node should be selected and allocated to the user communications device 10, the processor 2a determines where along the capacity share axis the determined value X lies. The processor then determines, by comparison with capacity share values stored in the memory 2b, which capacity share value correlates with the value X. In the example shown in FIG. 2, the calculation of X is determined to 49. This indicates that the transceiver node 5 is to be selected and allocated to the user communications node 10.

The following pseudo code summarises the steps of arranging the share capacity values on the capacity share axis, and the step of determining therefrom a transceiver node which is to be allocated:

```
Limit = 0
if (X > = Limit && X < = Limit + share of SGSN[i]) then
    choose this SGSN
    break
else
    Limit = Limit + share of SGSN[i] + 1
Next
```

It is to be noted that the term 'limit' relates to an upper limit value of a capacity share value on the capacity share axis.

Figure 3:
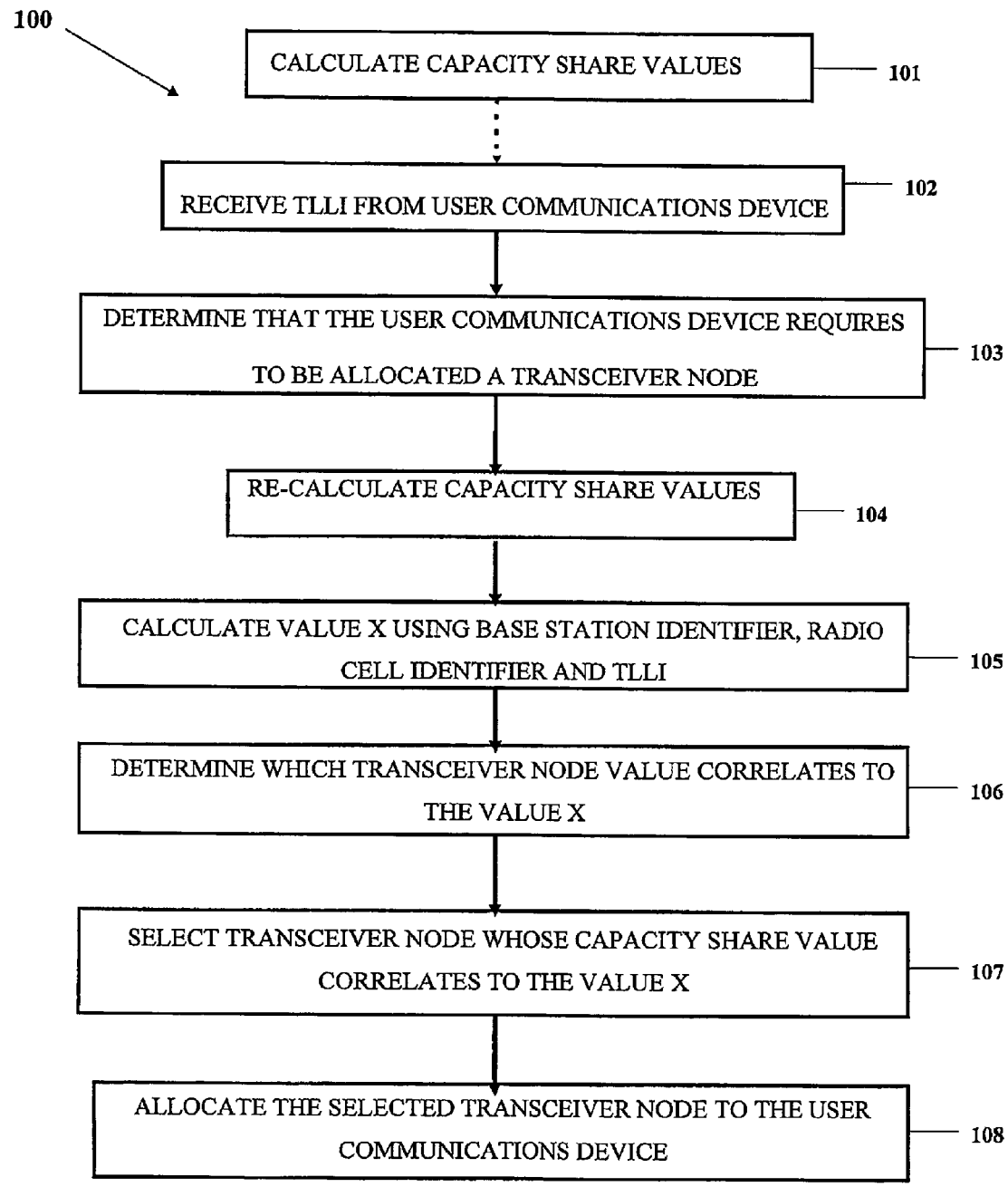

FIG. 3 shows a flow diagram 100 which includes the principle process steps involved in the method of allocation performed by the base station node 2. At step 101 the base station node initially determines the capacity share values of the transceiver nodes. When a user communications node commences signalling exchanges with the base station node, at step 102 the base station node receives a TLLI from the user communications device and at step 103 the base station node determines that the user communications node needs to be allocated a transceiver node. At step 104 the base station node re-calculates the capacity share values to take account of any transceiver nodes having been added or removed from the pool. At step 105 the base station node uses the TLLI, the BVCI and the NSEI to calculate the value X. At step 106 the base station node determines which capacity share value the metric X correlates to. At steps 107 and 108 a transceiver node is selected and allocated to the user communications device.

Advantageously, the above described method and base station node is capable of fairly distributing transceiver nodes to user communications devices, even if some of the user communication devices 'misbehave' by using non-random TLLIs. Because calculation of the value X takes into account both an identifier of the base station node and an identifier of a respective radio cell in which a user communications device is located, this significantly decreases the likelihood that only one or a few transceiver nodes will be selected. So, if the user communications device is in a radio cell shown schematically at 20 and the user communications device 12 is in the radio cell shown schematically at 30, then because each of the radio cells 20 and 30 have different BVCIs it is likely that a different transceiver node will be allocated to each. In the case where a pool of transceiver nodes is shared by two base station nodes, if different user communications devices use the same TLLI and if some of those user communications devices use one base station node and the other user communications devices use the other base station node then the radio cell identifiers and the base station identifiers will be different for each group of user communications devices. Since the base station identifier will be different for each group of user communications devices this significantly reduces the likelihood that allocations of the two base stations will be concentrated on one or a few of the transceiver nodes. Moreover, if the user communications devices of each group are in different respective radio cells then this further reduces the likelihood of allocations being concentrated to one or a few of the pool of transceiver nodes.

It will be appreciated that the greater a capacity share value of a transceiver node (as compared to other nodes in the pool) the more likelihood that that node will be selected. This is advantageous because transceiver nodes with larger (relative) capacity are more likely to be chosen.

It will be appreciated that in alternative calculations of the value X, only the TLLI and the BCVI could be used or only the TLLI and the NSEI could be used. Either alternative calculation would still result in reducing the likelihood that allocations would be concentrated onto one or a few transceiver nodes for misbehaving user communication devices.

The invention claimed is:

1. A method of selecting a communications node for allocation to a user communications device, the method comprising the steps of:
    selecting the communications node from a plurality of communications nodes of a communications network, by:
        performing a calculation to determine a selection value, which calculation includes as input data at least one of first identifier data identifying selection equipment configured to select a communications node from the plurality of communications nodes, and second identifier data identifying a radio cell with which the user communications device is associated; and
        using the selection value in selecting the communications node.

2. The method as claimed in claim 1 which comprises determining respective communications node values related to a parameter of the plurality of communications nodes.

3. The method as claimed in claim 2 in which one of the respective communications node values comprises a measure of signal processing capability of one of the plurality of communications nodes.

4. The method as claimed in claim 3 in which one of the respective communications node values comprises a measure of signal processing capability of one of the plurality of communications nodes in relation to the combined signal processing capabilities of the plurality of communications nodes.

5. The method as claimed in claim 4 comprising determining which communications node value correlates to the selection value, and selecting a selected communications node associated with that communications node value.

6. The method as claimed in claim 4 in which the first identifier data comprises data uniquely identifying the selection equipment in the communications network.

7. The method as claimed in claim 6 in which the first identifier data comprises a Network Service Entity Identifier (NSEI) of the selection equipment.

8. The method as claimed in claim 2 in which one of the respective communications node values comprises a measure of the combined signal processing capabilities of one of the plurality of communications nodes.

9. The method as claimed in claim 1 in which the second identifier data comprises a Base Station Subsystem General Packet Radio Service Protocol Virtual Connection Identifier (BVCI) of the radio cell.

10. The method as claimed in claim 1 in which the calculation includes as input data logical link identifier data comprising data identifying a logical link between the user communications device and the selection equipment.

11. The method as claimed in claim 10 in which the logical link identifier data comprises a Temporary Logical Link Identifier (TLLI).

12. The method as claimed in claim 1 which is implemented by a processor of the selection equipment which equipment is logically intermediate of the user communications device and the plurality of communications nodes.

13. A processor equipment for a communications network, the processor equipment configured to:
select a selected communications node from a plurality of communications nodes;
allocate the selected communications node to a user communications device; and
the processor equipment configured to make a selection by performing a calculation to determine a selection value, the calculation includes as input data at least one of first identifier data identifying the processor equipment, and second identifier data identifying a radio cell with which the user communications device is associated, and the processor equipment is further configured to use the selection value in selecting the selected communications node.

14. A base station subsystem comprising:
a processor equipment configured to:
select a selected communications node from a plurality of communications nodes;
allocate the selected communications node to a user communications device; and
the processor equipment further configured to make a selection by performing a calculation to determine a selection value, the calculation includes as input data at least one of first identifier data identifying the processor equipment, and second identifier data identifying a radio cell with which the user communications device is associated, and the processor equipment is further configured to use the selection value in selecting the selected communications node.

15. A communications network comprising:
a processor equipment;
a plurality of communications nodes; and
the processor equipment configured to select a selected communications node from the plurality of communications nodes and allocate the selected communications node to a user communications device, the processor equipment further configured to make a selection by performing a calculation to determine a selection value, the calculation includes as input data at least one of first identifier data identifying the processor equipment, and second identifier data identifying a radio cell with which the user communications device is associated, and the processor equipment is further configured to use the selection value in selecting the selected communications node.

16. A non-transitory computer readable medium that stores machine-readable instructions for configuring a processor of a communications node, the instructions configure the processor to select a selected communications node from a plurality of communications nodes of a communications network and allocate the selected communications node to a user communications device, wherein the instructions configure the processor to make a selection by performing a calculation to determine a selection value, the calculation includes as input data at least one of first identifier data identifying the processor equipment, and second identifier data identifying a radio cell with which the user communications device is associated, and the instructions also configure the processor to use the selection value in selecting the selected communications node.

* * * * *

UNITED STATES PATENT AND TRADEMARK OFFICE
CERTIFICATE OF CORRECTION

PATENT NO. : 8,385,925 B2
APPLICATION NO. : 13/058866
DATED : February 26, 2013
INVENTOR(S) : Johansson It is certified that error appears in the above-identified patent and that said Letters Patent is hereby corrected as shown below:

In the Specifications:

In Column 1, Line 13, delete "Project" and insert -- Project: --, therefor.

In Column 2, Line 10, delete "node" and insert -- node. --, therefor.

In Column 6, Line 36, delete "BCVI" and insert -- BVCI --, therefor.

In the Claims:

In Column 6, Line 47, in Claim 1, delete "network," and insert -- network --, therefor.

Signed and Sealed this
Ninth Day of July, 2013

Teresa Stanek Rea
*Acting Director of the United States Patent and Trademark Office*